(12) United States Patent
Ramesh et al.

(10) Patent No.: US 8,214,371 B1
(45) Date of Patent: Jul. 3, 2012

(54) SPATIAL INDEXING

(75) Inventors: Bhashyam Ramesh, San Diego, CA (US); Michael W. Watzke, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 3298 days.

(21) Appl. No.: 10/622,666

(22) Filed: Jul. 18, 2003

(51) Int. Cl.
*G06F 7/00* (2006.01)
*G06F 17/30* (2006.01)

(52) U.S. Cl. ........................ 707/743
(58) Field of Classification Search .............. None
See application file for complete search history.

(56) References Cited

OTHER PUBLICATIONS

Kothuri et at., "Quadtree and R-Tree indexes in Oracle Spatial: A Comparison using GIS Data", ACM SIGMOD '2002, pp. 546-557, Jun. 2002, ACM.*
Hjalatason et al., "Speeding up construction of PMR quadtree-based spatial indexes", VLDB Journal, vol. 11, No. 2, pp. 109-137.*
Aggarwal et al., "The Input/Output Complexity of Sorting and Related Problems", Communications of the ACM, vol. 31, No. 9, pp. 1116-1127, Sep. 1988.*
Bernd Schnitzer, Scott T. Leutenegger; Master-Client R-Trees; A New Parallel R-Tree Architecture; 11th International Conference on Scientific and Statistical Database Management, Jul. 1999.
Nikos Koudas, Christos Faloutsous, Ibrahim Kamel; Declustering Spatial Databases on a Multi-Computer Architecture, 1996.

* cited by examiner

*Primary Examiner* — Michael Hicks
(74) *Attorney, Agent, or Firm* — Howard Speight

(57) ABSTRACT

A method, computer program, database system and data structure for indexing spatial objects are disclosed. Each spatial object has a location in an n-dimensional space. The indexing is for use in a partitioned parallel environment including P partitions. Each partition resides on one or more parallel processing systems. The n-dimensional space is divided into quad-tree cells (QTCs) in a quad-tree structure. Each spatial object is assigned to one or more QTCs based on the location of the spatial object in the n-dimensional space. A spatial object index entry is created which includes a designator for the QTC to which the spatial object is assigned and a pointer to the spatial object. The entries are sorted by their QTC numbers into a list. The list of entries is divided into P substantially equal parts. The entries associated with each part are stored in a different one of the P partitions.

18 Claims, 8 Drawing Sheets

_US 8,214,371 B1_

SPATIAL INDEXING

BACKGROUND

In recent years, databases have been used to store more and more exotic types of information. They are no longer limited to storing alphanumeric characters or numbers (such as names, addresses, zip codes, salaries, etc.) but are also used to store, for example, images, audio files, and data formatted according to the user's own specification.

In some applications, the data stored by a database has a spatial component. For example, in addition to storing the name, address, telephone number, social security number, salary, etc. for its employees, a company may also store a spatial component—the geographic location of each employee. That information might be useful, for example, if the company is attempting to arrange training for its employees based on the location of the employees.

In some parallel processing systems, database tables are stored in partitions that are distributed among data storage facilities associated with the parallel processing system. In some of those systems, the tables including columns of spatial information may be partitioned using other non-spatial columns of the table. In those cases, efficient searching using the spatial information is a challenge.

SUMMARY

In general, in one aspect, the invention features a global spatial index for use in a partitioned parallel environment including P partitions. The partitions reside on one or more parallel processing systems. The environment includes a linear quad-tree structure which divides an n-dimensional space into linear quad-tree cells (QTCs). The QTCs each have a designator. The global spatial index is for a set of spatial objects. The spatial objects are each assigned to one or more of the QTCs depending on the location of the spatial object in the n-dimensional space. Further included in the global spatial index are one or more index entries for each spatial object. The index entries include the designator for the QTC to which the spatial object was assigned and a pointer to the spatial object. The index entries of the global spatial index are stored in substantially equal numbers among the P partitions. The partition where each index entry is stored is determined by sorting the index entries by QTC designator into a list, dividing the list into P substantially equal parts and storing the index entries associated with each part of the list in a different partition. An index entry is duplicated in two or more partitions only if the location of the spatial object falls into two or more QTCs for which index entries are stored in more than one partition.

Implementations of the invention may include one or more of the following. The global spatial index may include a split vector having P-1 elements where each element is associated with a boundary between two of the parts of the list. The global spatial index may include a split vector having P-1 elements where each element identifies a range of QTC designations associated with a part. The range of QTC designations associated with a part may be identified from a range of QTC designations associated with a first part that overlaps a range of QTC designations associated with a second part. The global spatial index may include an assignment map for recording information regarding storage of the index entries. Each QTC designator may be a number assigned by an algorithm for linearizing the designations of QTCs in a quad-tree structure. The index entries within a partition may be value ordered by QTC designator.

In general, in another aspect, the invention features a method for indexing spatial objects. The spatial objects are located in an n-dimensional space. The indexing is used in a partitioned parallel environment including P partitions and where each partition resides on one or more parallel processing systems. The method includes dividing the n-dimensional space into quad-tree cells (QTCs) in a quad-tree structure. The QTCs each have a designator. The method further includes assigning each spatial object to one or more QTCs based on the location of the spatial object in the n-dimensional space and creating a spatial object index entry for each QTC to which the spatial object was assigned. Each index entry includes the designator of the QTC to which the spatial object was assigned and a pointer to the spatial object. The method further includes sorting the index entries by their QTC numbers into a list, dividing the index entries in the list into P substantially equal parts, and storing the index entries associated with each part in a different one of the P partitions.

Implementations of the invention may include one or more of the following. The method may include assigning a designator using an algorithm that linearly numbers the QTCs in the n-dimensional space. The method may include recording information regarding assignment of the index entries in an assignment map.

In general, in another aspect, the invention features a database system. The database system includes a massively parallel processing system having one or more nodes, a plurality of CPUs, where each of the one or more nodes provides access to one or more CPUs. The parallel processing system further includes a plurality of data storage facilities, each of the one or more CPUs providing access to one or more data storage facilities, and P partitions, each partition residing on one or more data storage facilities. The database system further includes a process for indexing spatial objects having a location in an n-dimensional space. The indexing process includes dividing the n-dimensional space into quad-tree cells (QTCs) in a quad-tree structure. The QTCs each have a designator. The indexing process also includes assigning each spatial object to one or more QTCs based on the location of the spatial object in the n-dimensional space and creating a spatial object index entry for each QTC to which the spatial object was assigned. The index entries include the designator of the QTC to which the spatial object was assigned and a pointer to the spatial object. The indexing process further includes sorting the index entries by their QTC numbers into a list, dividing the index entries in the list into P substantially equal parts, and storing the index entries associated with each in a different one of the P partitions.

Implementations of the invention may include one or more of the following. Dividing the n-dimensional space may include assigning a designator to each QTC using an algorithm that linearly numbers the QTCs in the divided n-dimensional space. The indexing process may also include recording information regarding assignment of the index entries in an assignment map.

In general, in another aspect, the invention features a database system. The database system includes a massively parallel processing system. The massively parallel processing system includes one or more nodes, a plurality of CPUs where each of the one or more nodes provides access to one or more CPUs and a plurality of data storage facilities where each of the one or more CPUs provides access to one or more data storage facilities. The data storage facilities include P partitions, each partition residing on one or more data storage facilities. The database system further includes a process for balancing the storage of index records for spatial objects among P partitions, where each spatial object has a location in an n-dimensional space and each spatial object is stored in one or more of the P partitions. The balancing process includes assigning designators to regions that divide the n-dimensional space and where each spatial object location falls into one or more regions. The balancing process also includes creating a separate spatial object index record for each region which includes the location of the spatial object. Each index record includes a pointer to its associated spatial object and a designator for a region that includes the location of its associated spatial object. The balancing process further includes dividing the index records substantially equally among the P partitions such that a large majority of the index records stored in each partition include designators that are for regions that are substantially near each other in the n-dimensional space.

Implementations of the invention may include one or more of the following. Assigning designators may include dividing the n-dimensional space into regions that are quad-tree cells (QTCs) in a quad-tree structure and assigning a designator to each QTC using an algorithm that linearly numbers the QTCs in the divided n-dimensional space. The balancing process may also include assigning each spatial object to one or more QTCs based on the location of the spatial object in the n-dimensional space and assigning a spatial object index entry for each QTC to which the spatial object was assigned. The index entry may include the designator of the QTC to which the spatial object was assigned and a pointer to the spatial object. Further, dividing the index records substantially equally among the P partitions may include sorting the index entries by their QTC numbers into a list, dividing the index entries in the list into P substantially equal parts, and storing the index entries associated with each part in a different one of the P partitions.

In general, in another aspect, the invention features a computer program, stored on a tangible storage medium. The computer program may be used in indexing spatial objects of a partitioned parallel environment including P partitions, where each partition resides on one or more parallel processing systems and each spatial object has a location in an n-dimensional space. The program includes executable instructions that cause a computer to divide the n-dimensional space into quad-tree cells (QTCs) in a quad-tree structure, each QTC having a designator. The program further includes executable instructions that cause a computer to assign each spatial object to one or more QTCs based on the location of the spatial object in the n-dimensional space and create a spatial object index entry for each QTC to which the spatial object was assigned. The index entries created include the designator of the QTC to which the spatial object was assigned and a pointer to the spatial object. The program also includes executable instructions that cause a computer to sort the index entries by their QTC numbers into a list, divide the index entries in the list into P substantially equal parts, and store the index entries associated with each part in a different one of the P partitions.

In general, in another aspect, the invention features a method, for use in a partitioned parallel environment, for accessing a spatial object using a global spatial index. The method includes identifying the one or more QTCs containing the spatial object, identifying the partitions where index entries for the one or more identified QTCs are stored using an assignment map, searching within the identified partitions using the identified QTCs for index entries for the spatial object, and accessing the spatial object using the index entries.

In general, in another aspect, the invention features a method, for use in a partitioned parallel environment, for joining two tables containing spatial objects, set 1 and set 2, using a global spatial index. The method includes, for each spatial object in set 1, identifying the one or more QTCs containing the spatial object, identifying the partitions where index entries for the one or more identified QTCs are stored using an assignment map, searching within the identified partitions using the identified QTCs for index entries for the spatial objects contained in set 2, and accessing the spatial objects in set 2 using the index entries.

DETAILED DESCRIPTION

Figure 1:
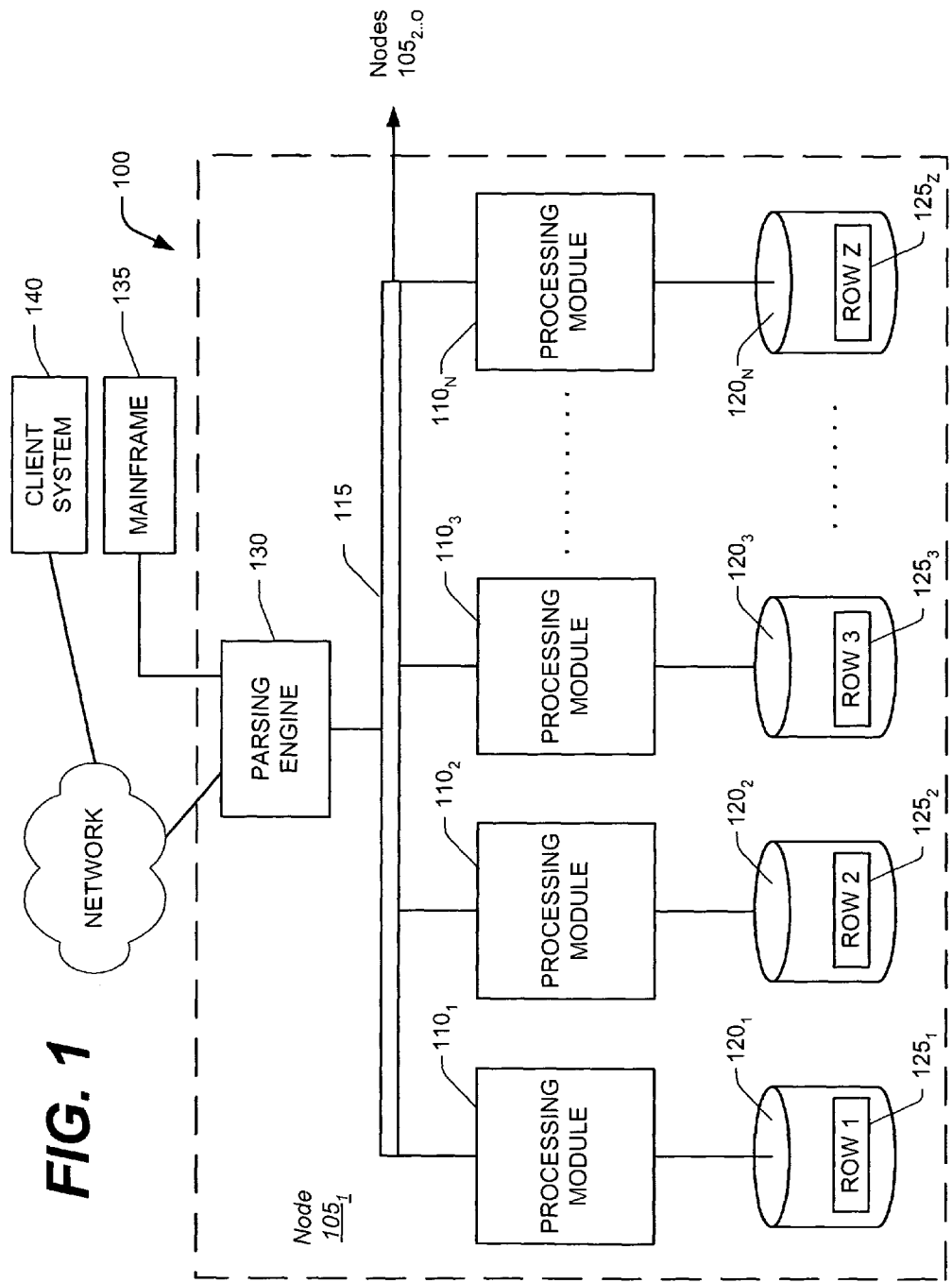
FIG. 1 is a block diagram of a node of a parallel processing database system.

The spatial indexing technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node 1051, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
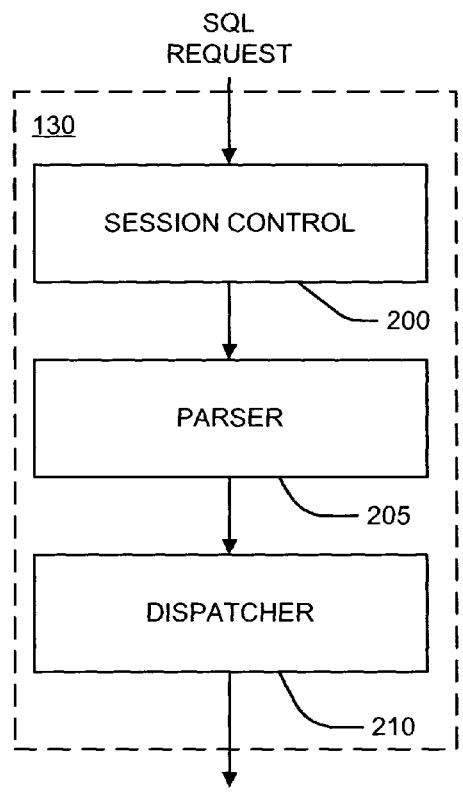
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
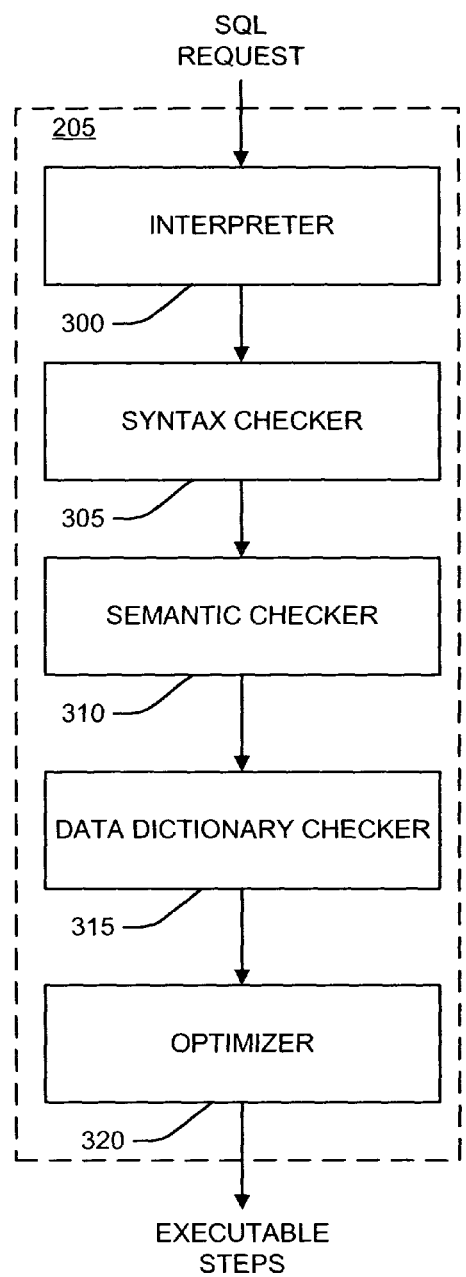
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
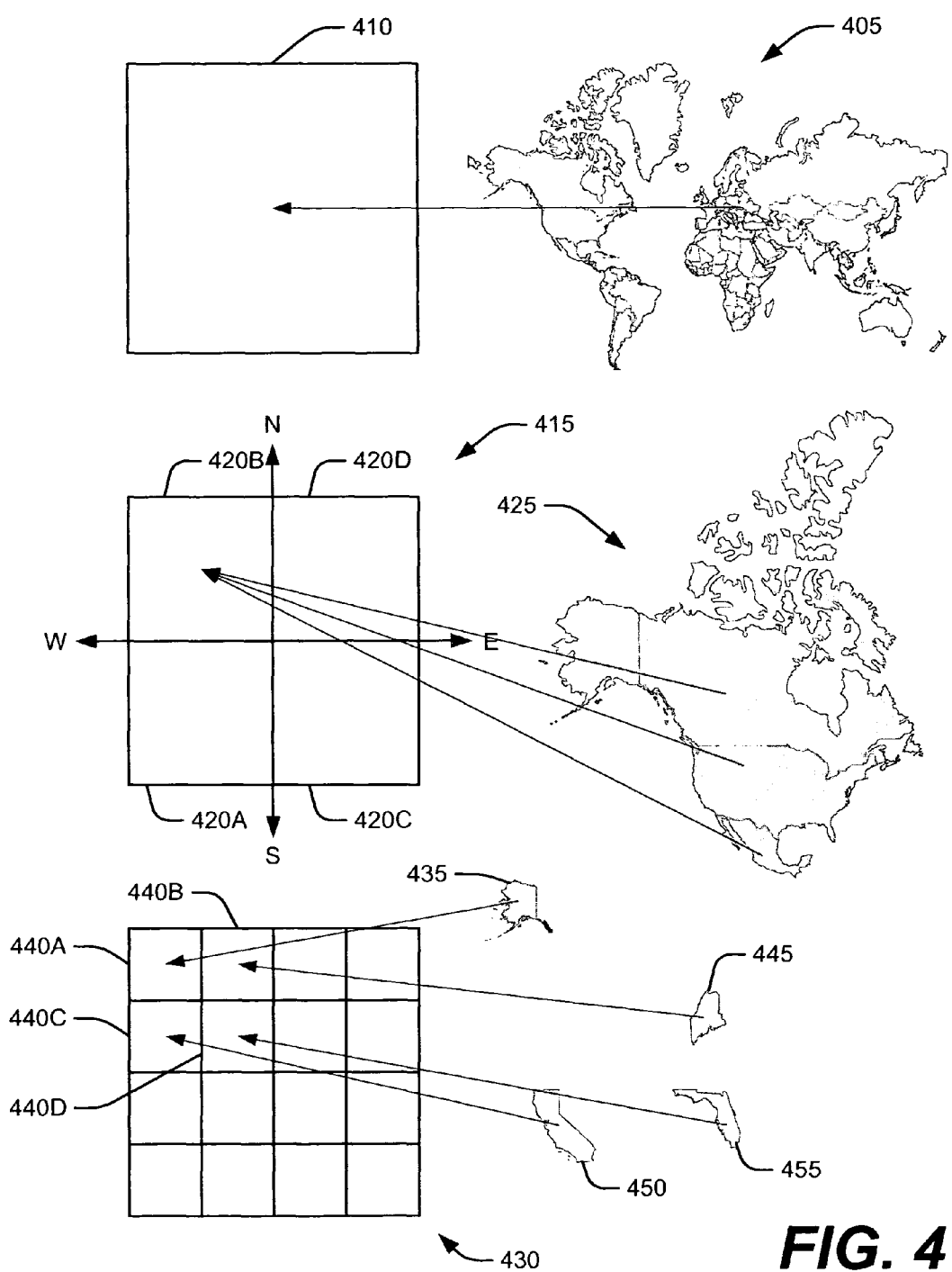
FIG. 4 illustrates the mapping of spatial elements to quad-tree cells.

An example where spatial indexing might be useful, illustrated in FIG. 4, uses a quad tree structure to spatially organize the elements of a set of data elements. In the example shown in FIG. 4, the goal is to store the outlines of the borders of the countries in the world and to create a spatial index to allow that data to be efficiently retrieved.

It will be readily understood that the techniques about to be described will apply equally well to other spatially-organized data and to other types of data. For example, rather than storing an outline of the borders of the countries, the database might store a satellite image of the country or an image from a map. The type of data stored is not a limitation.

It will also be understood that the techniques described here are applicable to data that is spatially organized in more than two dimensions. For example, a database of a company's employees might include the location of the employees within a multi-story building which would require three dimensions, i.e., the floor and x, y coordinates of the employees' offices. The database could also be extended to include time as a fourth dimension to capture information regarding an employee's moves among offices as a function of time, for example.

Returning to FIG. 4, the quad tree structure is represented by the array of boxes on the left side of the figure. The data elements are represented by the map segments on the right side of the figure. In the top row of FIG. 4, the outline of the border of the entire world 405 is associated with a quad tree cell 410 at the highest level in the quad tree structure. The quad tree structure has multiple levels of granularity with each succeeding level being a four-way division of the n-dimensional space represented by the preceding level. In the example shown in FIG. 4, the n-dimensional space is the 2-dimensional map of the world and the division is done along the points of the compass. Thus, the next level 415 of the quad tree structure has four quad tree cells (QTCs) 420a, 420b, 420c and 420d, with QTC 420a being the southwest quadrant, QTC 420b being the northwest quadrant, QTC 420c being the southeast quadrant, and QTC 420d being the northeast quadrant. It will be understood that the division could be done along other geographical lines. For example, the lines separating the quad-tree could be rotated forty-five degrees so that they run from south-west to north-east and from northwest to south-east.

In the example shown in FIG. 4, the outlines of the borders of the elements of the outline of the border of the entire world 405 are assigned to QTCs depending on their geographic location. For example, the outline of the border of North America 425 is assigned to QTC 420b because it is in the northwest quadrant of the map of the world. Similarly, the outlines of the borders of the United States, Mexico and Canada are also assigned to QTC 420b.

In the next level 430 of the quad tree structure, shown in the bottom row of FIG. 4, the preceding level 415 is divided as shown into sixteen QTCs, with each of the QTCs in the preceding level being divided evenly into four QTCs. The outlines of the borders of the elements of the outline of the border of North America are assigned to QTCs depending on their geographic location. For example, the outline of the border of Alaska 435 is assigned to QTC 440a because it is in the far northeast corner of North America. Similarly, the outline of the border of Maine 445 is assigned to QTC 440b, the outline of the border of California 450 is assigned to QTC 440c, and the outline of the border of Florida is assigned to QTC 440d.

While only three quad tree levels are shown in FIG. 4, the quad tree structure can be extended indefinitely to divide the n-dimensional space into smaller and smaller QTCs.

With the n-dimensional space divided into QTCs at multiple levels of resolution, as shown in FIG. 4, the system is prepared to build a spatial index. The data elements to be spatially indexed are already distributed among the data storage facilities $125_1 \ldots _Z$ most likely not using geographic location as a primary index. The spatial indexing technique described herein creates a spatial index table for the data elements to be indexed with each row in the spatial index table including the QTC associated with a data element and a pointer to the data element. The spatial index table is then distributed among the data storage facilities $125_1 \ldots _Z$ using the QTC designation as the primary key for the distribution. The distribution is done in such a way that the load on the data storage facilities $125_1 \ldots _Z$ is substantially balanced.

In one example system, the QTCs are numbered in such a way that when the index entries are distributed among the data storage facilities $125_1 \ldots _Z$, index entries for data elements associated with QTCs that are near each other geographically are likely to be stored in the same data storage facilities $125_1 \ldots _Z$. This is accomplished through the use of a linear representation of the n-dimensional space. In one example system, the linear representation of the n-dimensional space is accomplished through the use of a known Z-ordering algorithm, illustrated in FIG. 5. As can be seen, the highest level QTC 505 does not have a numerical designation because it is the only QTC at this level. The next lower level 510 has four QTCs numbered as shown in FIG. 4, with the numbers being assigned to the QTCs in a Z-pattern. That is, the lower left hand QTC is assigned the number "00," the upper left hand QTC is assigned the number "01," the lower right hand QTC is assigned the number "10," and the upper right hand QTC is assigned the number "11." This numbering technique is called "Z-ordering" because a line drawn from QTC to QTC in the order that they are numbered, as shown in FIG. 5, produces a Z pattern.

Figure 5:
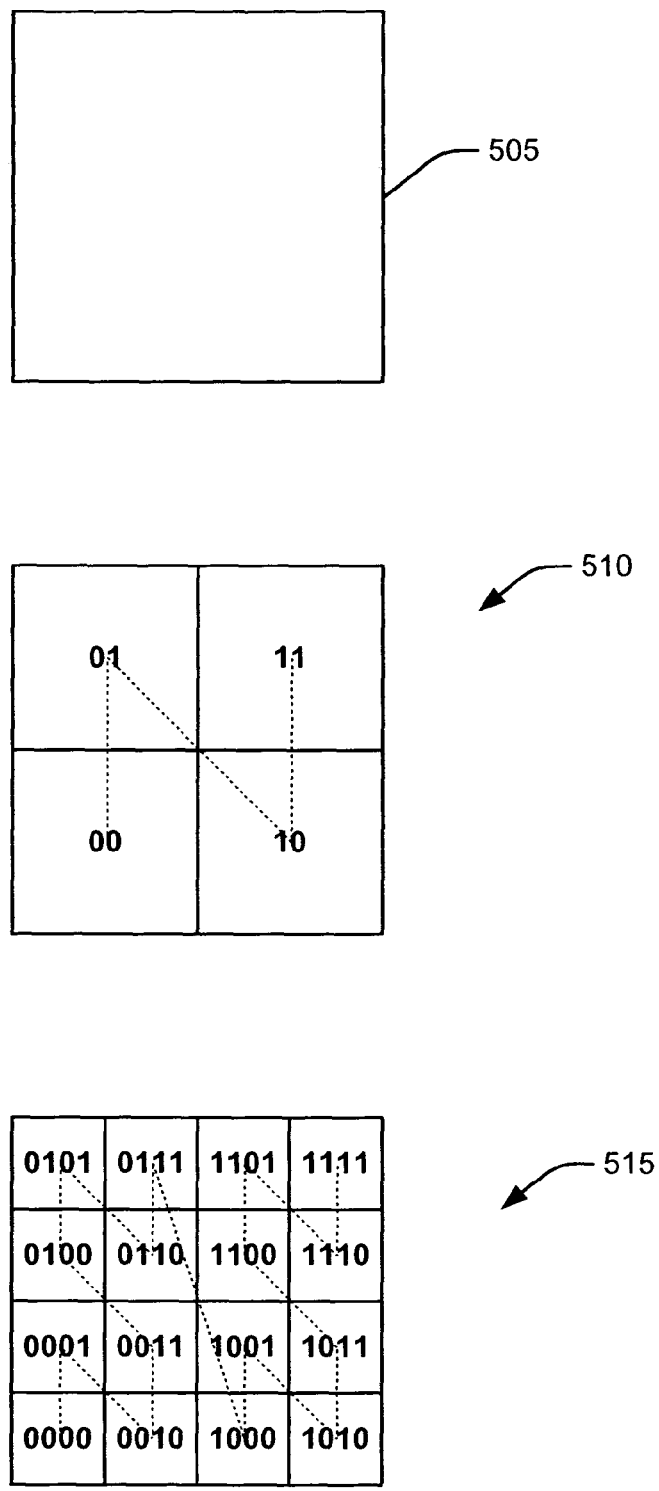
FIG. 5 illustrates numbering quad-tree cells using a Z-ordering algorithm.

This Z-ordered numbering is applied to successively lower levels in the quad tree structure while preserving the relationship between QTCs at different levels in the quad tree structure, as shown in FIG. 5. For example, parent QTC 00 in level 510 is divided into four child QTCs in the next lower level 515. Those four QTCs are numbered using the parent QTC "00" as the first two digits and then following the Z-ordering algorithm to assign the second two digits of the QTC number to produce QTCs numbered "0000," "0001," "0010," and "0011," as shown in FIG. 5. The other QTCs in level 515 are assigned similarly so that the QTCs in level 515 have four binary digit numbers ranging from "0000" to "1111."

The benefit of this linear representation of n-dimensional space is that when the spatial index records, which consist of the QTC number and a pointer to the indexed element, are distributed among the data storage facilities $125_{1 \ldots z}$ using QTC number as the primary key for distribution, index records representing data elements geographically close to each other are likely to fall in the same data storage facilities $125_{1 \ldots z}$ which will improve the efficiency of their retrieval.

Further, the QTCs at each level of the quad tree structure, except the bottom level, each cover a spatial interval in the n-dimensional space. The interval for a particular QTC is that associated with all of the QTCs in the quad tree structure immediately below that QTC. Thus, QTC "00" shown in FIG. 5, represents not just itself but the interval of QTCs "0000," "0001," "0010," and "0011" and the QTCs that fall below each of those QTCs in the quad tree structure down to the lowest level in the structure.

Figure 6:
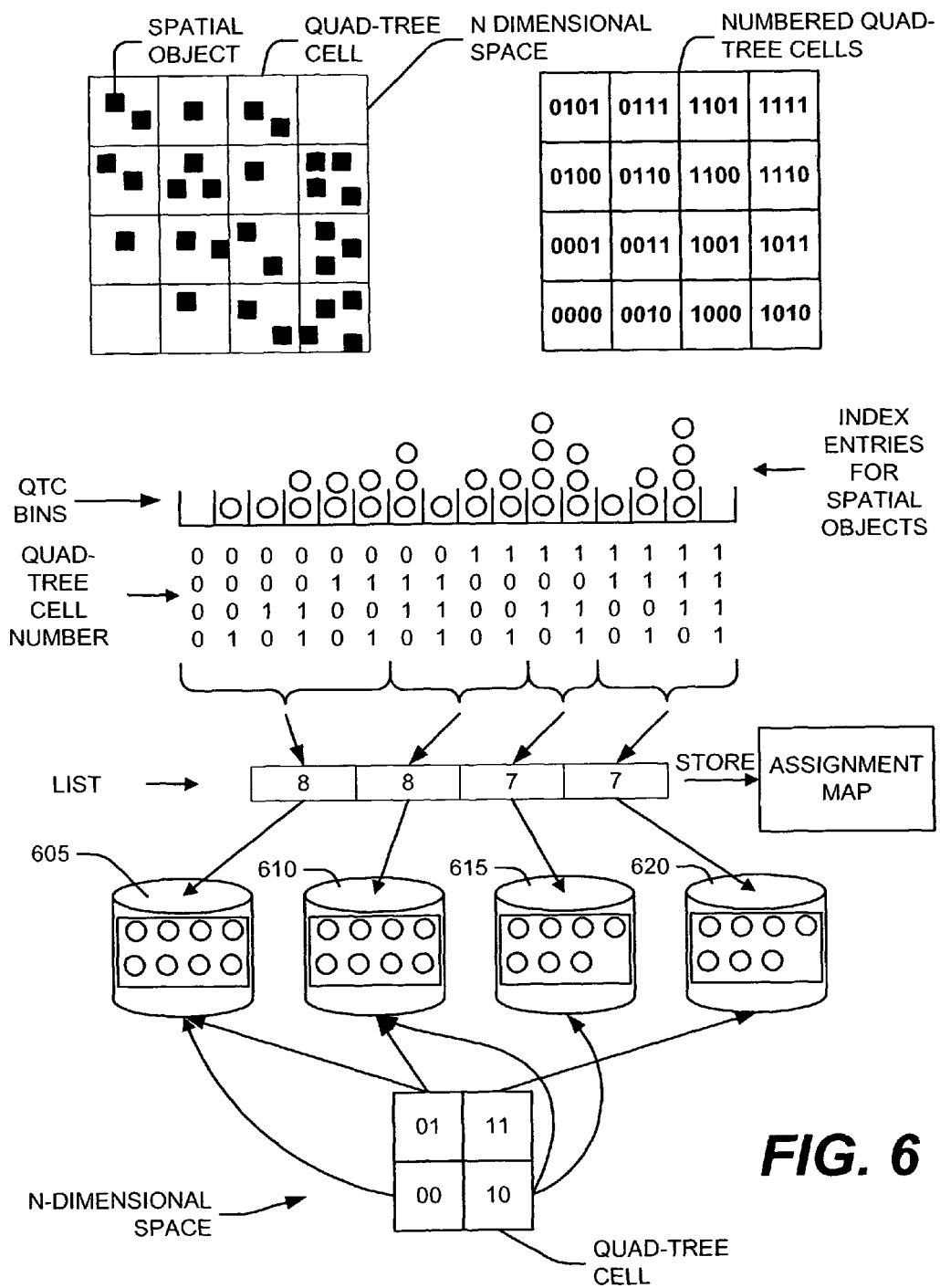
FIG. 6 illustrates the spatial indexing algorithm.

The creation of the spatial index table and its distribution among the data storage facilities $125_{1 \ldots z}$ begins by partitioning the n-dimensional space into disjoint cells, e.g. QTCs, using a linear quad-tree structure, as shown in FIG. 6. The spatial objects, shown in FIG. 6 as black-filled squares, are assigned to QTCs based on their location in the n-dimensional space. The QTCs are numbered as shown in FIG. 6 using a linear numbering scheme such as the Z-ordering algorithm described above. Index rows, shown in FIG. 6 as open ovals, are then created for each spatial object. As discussed above, the index row includes, but is not limited to, the designator, e.g. number, for the QTC to which the spatial object was assigned and a pointer to the spatial object. A spatial object with a location that falls within two or more QTCs will have a separate index row for each QTC.

This illustrates another benefit of spatial indexing beyond balancing the load of storing the spatial index rows across the data storage facilities $125_{1 \ldots z}$. In some circumstances, a spatial data element will be assigned to more than one partition. This might occur in the situation illustrated in FIG. 4, for example, if one of the outlines of the border of a geographical element (e.g. a continent) falls into two or more partitions. In the spatial indexing system described herein, rather than storing the spatial data element (i.e. the outline of the border of the geographical element) in the two or more partitions, only a spatial index row for the spatial data element is stored in each of the two or more partitions. Further, the fact that the spatial index rows are sorted by QTC number before they are stored has the effect of reducing the number of spatial data elements that cross partition boundaries which in turn diminishes the likelihood that a spatial index row will need to be duplicated in two partitions. Thus, spatial indexing reduces skew in the storage of the spatial index rows by creating P relatively equal-sized ranges with a P-1 split vector, as discussed below, minimizes duplication of index entries, and eliminates duplication of spatial data objects because of partitioning.

The index rows for the spatial objects are then sorted into QTC number bins. For example, the bin associated with QTC "0000" has no index rows sorted into it and the bin associated with QTC "1010" has four index rows sorted into it.

A list of index rows is then created and divided into P parts in such a way that the number of index rows assigned to each part is approximately equal. Consequently, when the index rows from each part of the list are assigned to different partitions within the data storage facilities, the burden for storing the index is spread relatively evenly across all of the data storage facilities. In one example system the number of parts P is chosen to be equal to a number of physical partitions in the system, such as the number of data storage facilities $125_1 \ldots z$ in the system. Alternatively, the number of parts could be chosen to be equal to a number of logical partitions in the system, with the logical partitions being associated with partitions within or across the data storage facilities $125_{1 \ldots z}$.

In the example shown in FIG. 6, the list is divided into four parts (P=4) with eight index rows in the first two parts and seven index rows in the last two parts. In the example shown, the QTC bins are not divided when they are assigned to the parts. That is, all of the index rows in a QTC bin are assigned to the same part. Preferably, the division of the index rows among QTC bins could be made more uniform in some circumstances by allowing index rows from a single QTC bin to be assigned to two or more parts. In one example system, this is accomplished by sorting the index rows by QTC number as described above and offsetting into the list a number of index rows defined by the total number of index rows divided by the number of partitions (P), P-1 times to create a split vector of P equal sized intervals of index rows to be used for range partitioning the spatial index. In the example shown in FIG. 6, the result is the following split vector: (0101, 1001, 1011). Each entry in the split vector defines a boundary between the parts of the list. In some situations, as described above, a spatial object may occupy more than one QTC. For example, suppose that in FIG. 6 a spatial object occupies QTCs 1001 and 1010 and index entries for the spatial object are accordingly included in the second and third parts of the list. In that circumstance, a split vector may be defined so that the parts overlap, reflecting the fact that one or more spatial objects appear in two parts of the list. An example of such a split vector would be: (0000-0101, 0110-1001, 1001-1011, 1100-1111).

The index rows from each of the P parts are then assigned to one of the data storage facilities $125_{1 \ldots z}$ or to a logical partition as described above. Typically, the index rows stored in a particular partition are value ordered by QTC number.

As a result of this process, the quad tree structure for the n-dimensional space is mapped to the data storage facilities $125_{1 \ldots z}$ in such a way that index entries for data elements geographically located in a particular QTC are readily located within data storage simply by knowing the geographic location of the data element. For example, as shown at the bottom of FIG. 6, index entries for the range of data elements in QTC "00" are located in data storage facility 605. Index entries for the range of data elements in QTC "01" are located in data storage facilities 605 and 610. Index entries for the range of data elements in QTC "10" are located in data storage facilities 610 and 615. Index entries for the range of data elements in QTC "11" are located in data storage facility 620.

Figure 7:
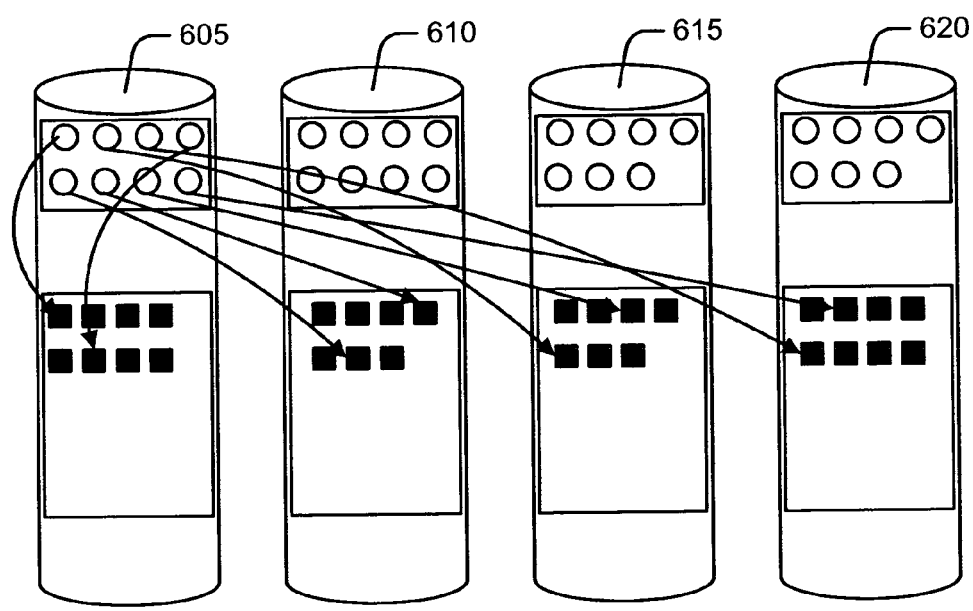
FIG. 7 illustrates the mapping between the index entries for the spatial elements and the spatial elements themselves.

The index entries stored on one data storage facility may include pointers to data elements stored in other data storage facilities, as shown in FIG. 7. To illustrate, the index entries (represented by open ovals) stored in data storage facility 605 have pointers to data elements (represented by black-filled squares) in data elements 605, 610, 615 and 620.

Figure 8:
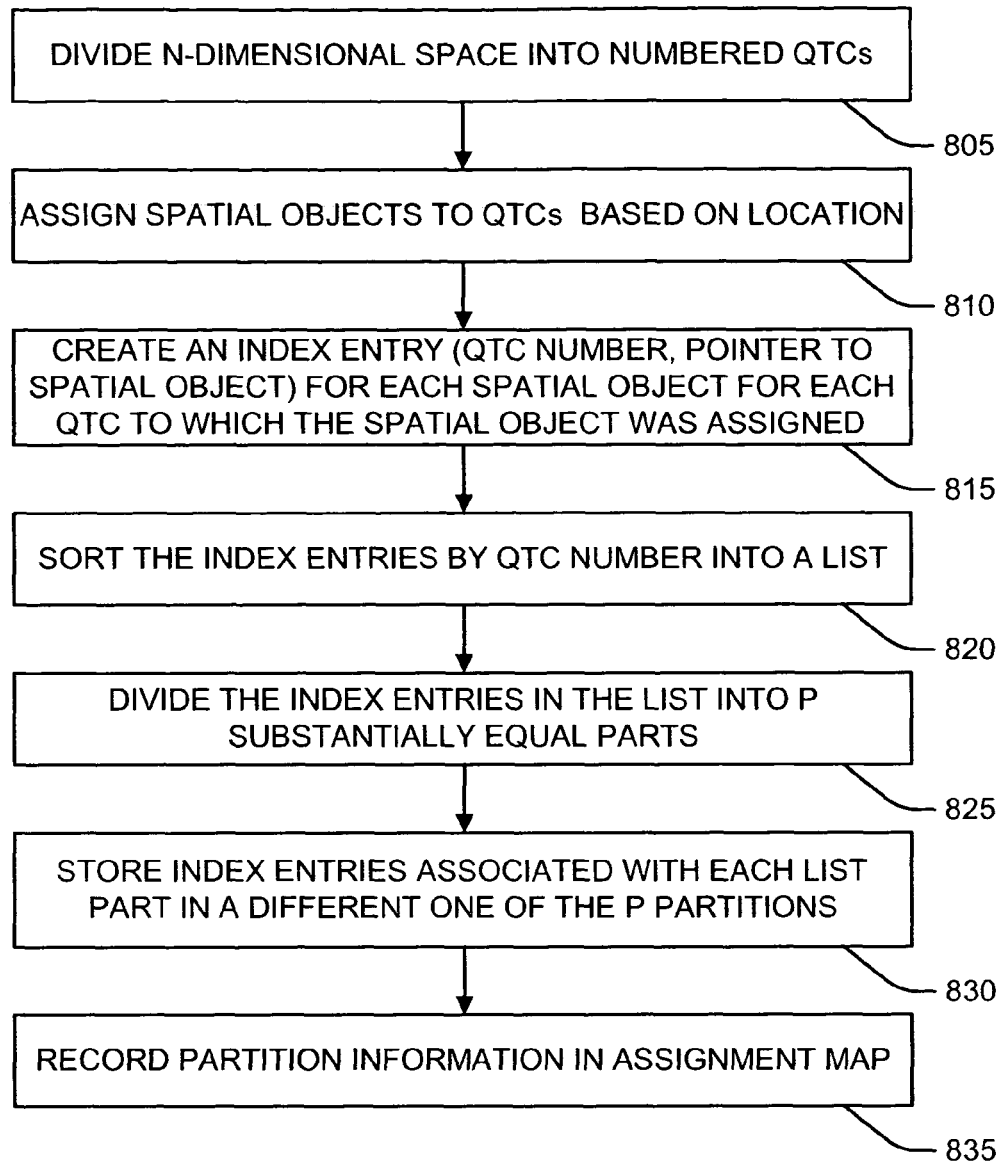
FIG. 8 is a flow chart of the spatial indexing algorithm.

In use, as shown in FIG. 8, an example system divides the n-dimensional space into numbered QTCs (block 805). It then assigns spatial objects to the QTC based on their locations (block 810). The system creates an index entry, which includes the QTC designator (or number) and a pointer to the spatial object, for each spatial object for each QTC to which the spatial object was assigned (block 815). The system then sorts the index entries by QTC designator (or number) (block 820) into a list and divides the index entries in the list into P substantially equal parts (block 825). The system stores the index entries associated with each part in a different one of the P partitions (block 830) and records the partitioning information in an assignment map (block 835).

Figure 9:
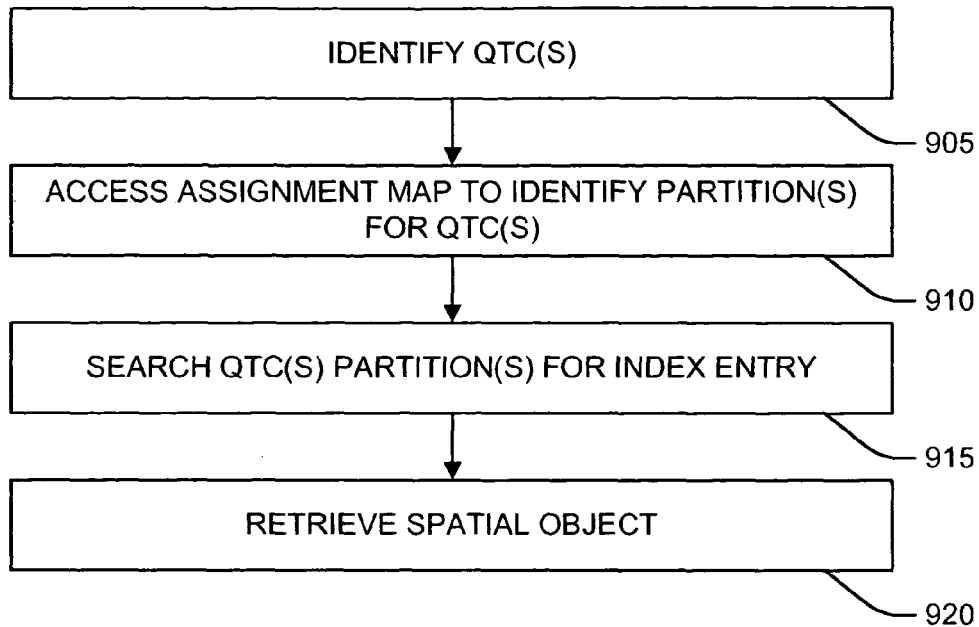
FIG. 9 is a flow chart illustrating the retrieval of spatially indexed spatial elements.

To retrieve a spatial object from a spatially indexed system, as shown in FIG. 9, the system first identifies the QTC or QTCs containing the index entry for the spatial object based on the location of the object (block 905). It then accesses the assignment map to identify partitions in which the QTC is stored (block 910). It then searches the identified QTC for the index record for the spatial object being sought (block 920), a process which is made more efficient by the fact that the index records are stored in QTC value order. Finally, it accesses the spatial object using the index record (block 925).

Figure 10:
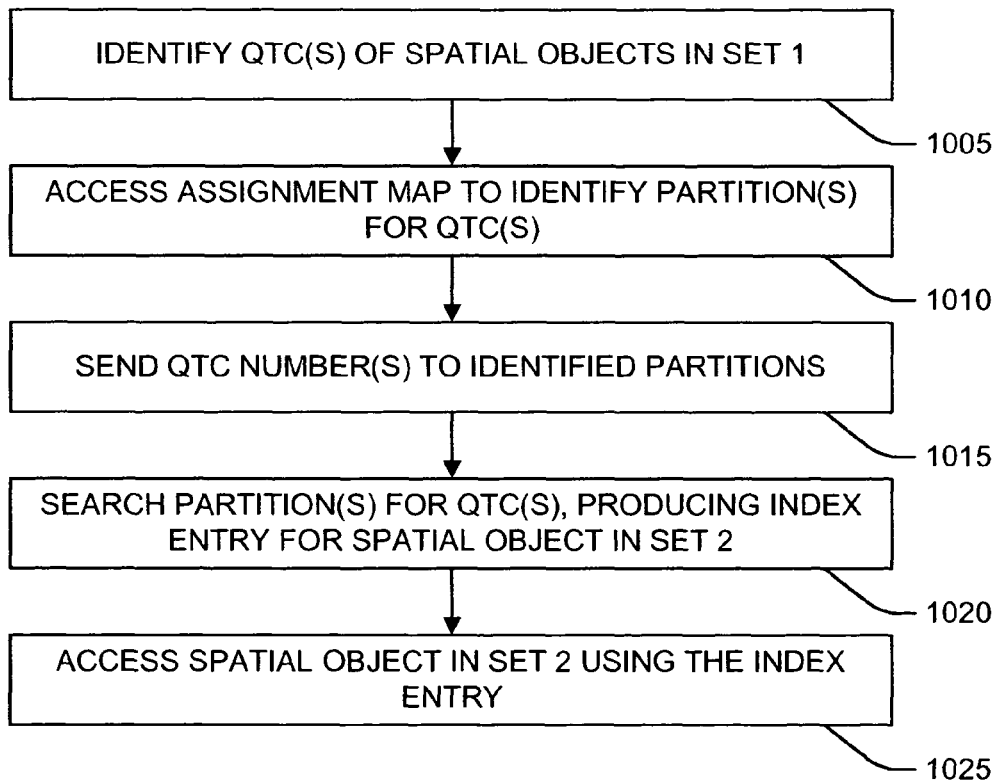
FIG. 10 is a flow chart illustrating a join of two tables containing spatially indexed spatial elements.

The following procedure would be used to perform a join of two tables of spatial objects, set 1 and set 2, using the spatial index, as shown in FIG. 10. The system first identifies the QTC(s) of the spatial objects in set 1 (block 1005). Then, for each QTC, the system accesses the assignment map to identify partitions in which that QTC is stored (block 1010). It then sends the QTC number(s) to be searched to the identified partitions (block 1015). Within each partition an index search is performed using the identified QTC from set 1 for the index records of the spatial object contained in set 2 (block 1020). This process is made more efficient by the fact that the index records are stored in QTC value order. Finally, the system accesses the spatial objects in set 2 using the index record (block 1025).

While this technique has utility in accessing individual records, as described above, it also has utility in accessing ranges of spatial data objects based on their index entries. This can also be illustrated with respect to FIG. 9. The system begins by identifying the QTC or QTCs that encompass the locations associated with the spatial data objects being sought (block 905). For example, referring back to FIG. 4, the system may seek the outlines of the borders of all geographic entities in the north western hemisphere of the world. In that case, the system would identify QTC 420*b* and all QTCs below that QTC in the quad tree structure. The system then accesses the assignment map to identify the partitions for the identifies ATCs (block 910, FIG. 9). The system then searches the identified partitions for index entries with the identified QTC or QTCs (block 920) and retrieves the associated spatial objects (block 925).

The text above describes one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating a global spatial index for use in a partitioned parallel environment including P partitions, each partition residing on one or more parallel processing systems, the global spatial index including:

creating a linear quad-tree structure dividing an n-dimensional space into linear quad-tree cells (QTCs), each QTC having a designator, the designators having an order;

creating a set of spatial objects, each spatial object being assigned to one or more of the QTCs depending on the location of the spatial object in the n-dimensional space;

creating one or more index entries for each spatial object, each index entry including the designator for the QTC to which the spatial object was assigned and a pointer to the spatial object; and storing the index entries in substantially equal numbers among the P partitions, at least one of the P partitions being stored on a different data storage facility than the other P-1 partitions, the partition where an index entry is stored being determined by:

sorting the index entries by QTC designator into QTC bins, each QTC bin corresponding to one of the QTCs, each QTC bin containing the index entries for the spatial objects that were assigned to that QTC;

working through the QTC bins in order of the QTCs' designators, dividing the index entries in the QTC bins into P substantially equal parts, even when the index entries are not uniformly distributed among the QTC bins;

storing the index entries associated with each part of the list in a different partition; and duplicating an index entry in two or more partitions only if the location of the spatial object falls into two or more QTCs for which index entries are stored in more than one partition.

2. The method of claim 1 further including:

creating a split vector having P-1 elements, each element being associated with a boundary between two of the parts of the list.

3. The method of claim 1 further including:

a split vector having P-1 elements, each element identifying a range of QTC designations associated with a part.

4. The method of claim 3 wherein the range of QTC designations associated with a first part overlaps the range of QTC designations associated with a second part.

5. The method of claim 1 further including:

an assignment map recording information regarding storage of the index entries.

6. The method of claim 1 where each QTC designator is a number assigned by an algorithm for linearizing the designations of QTCs in a quad-tree structure.

7. The method of claim 1 where the index entries within a partition are value ordered by QTC designator.

8. A method for indexing spatial objects, each spatial object having a location in an n-dimensional space, the indexing for use in a partitioned parallel environment including P partitions, each partition residing on one or more parallel processing systems, the method including:

dividing the n-dimensional space into quad-tree cells (QTCs) in a quad-tree structure, each QTC having a designator, the designators having an order;

assigning each spatial object to one or more QTCs based on the location of the spatial object in the n-dimensional space;

creating a spatial object index entry for each QTC to which the spatial object was assigned, the index entry including the designator of the QTC to which the spatial object was assigned and a pointer to the spatial object;

sorting the index entries by their QTC numbers into QTC bins, each QTC bin corresponding to one of the QTCs, each QTC bin containing the index entries for the spatial objects that were assigned to that QTC;

working through the QTC bins in order of the QTCs' designators, dividing the index entries in the QTC bins into P substantially equal parts, even when the index entries are not uniformly distributed among the QTC bins; and storing the index entries associated with each part in a different one of the P partitions, at least one of the P partitions being stored on a different data storage facility than the other P-1 partitions.

9. The method of claim 8 where each QTC is assigned a designator using an algorithm that linearly numbers the QTCs in the n-dimensional space.

10. The method of claim 8 further including:
recording information regarding assignment of the index entries in an assignment map.

11. A database system including:
a massively parallel processing system including:
one or more nodes;
a plurality of CPUs, each of the one or more nodes providing access to one or more CPUs;
a plurality of data storage facilities, each of the one or more CPUs providing access to one or more data storage facilities;
P partitions, each partition residing on one or more data storage facilities;
a process for indexing spatial objects, each spatial object having a location in an n-dimensional space, the process including:
dividing the n-dimensional space into quad-tree cells (QTCs) in a quad-tree structure, each QTC having a designator, the designators having an order;
assigning each spatial object to one or more QTCs based on the location of the spatial object in the n-dimensional space;
creating a spatial object index entry for each QTC to which the spatial object was assigned, the index entry including the designator of the QTC to which the spatial object was assigned and a pointer to the spatial object;
sorting the index entries by their QTC numbers into QTC bins, each QTC bin corresponding to one of the QTCs, each QTC bin containing the index entries for the spatial objects that were assigned to that QTC;
working through the QTC bins in order of the QTCs' designators, dividing the index entries in the QTC bins into P substantially equal parts, even when the index entries are not uniformly distributed among the QTC bins; and
storing the index entries associated with each in a different one of the P partitions, at least one of the P partitions being stored on a different data storage facility than the other P-1 partitions.

12. The database system of claim 11 where dividing the n-dimensional space includes assigning a designator to each QTC using an algorithm that linearly numbers the QTCs in the divided n-dimensional space.

13. The database system of claim 11 further including:
recording information regarding assignment of the index entries in an assignment map.

14. A database system including:
a massively parallel processing system including:
one or more nodes;
a plurality of CPUs, each of the one or more nodes providing access to one or more CPUs;
a plurality of data storage facilities each of the one or more CPUs providing access to one or more data storage facilities;
P partitions, each partition residing on one or more data storage facilities;
a process for balancing the storage of index records for spatial objects among the P partitions, each spatial object having a location in an n-dimensional space, each spatial object being stored in one or more of the P partitions, at least one of the P partitions being stored on a different data storage facility than the other P-1 partitions, the process including:
assigning designators to regions that divide the n-dimensional space, each spatial object location falling into one or more regions;
creating a separate spatial object index record for each region which includes the location of the spatial object, where each index record includes a pointer to its associated spatial object and a designator for a region that includes the location of its associated spatial object;
dividing the index records substantially equally among the P partitions, even when the spatial objects are not substantially equally distributed among the regions, such that a large majority of the index records stored in each partition include designators that are for regions that are substantially near each other in the n-dimensional space, wherein the partition where an index entry is stored being determined by a process that comprises, sorting the index entries by designator into bins, each bin corresponding to one of the regions, each bin containing the index entries for the spatial objects that were assigned to that region.

15. The database system of claim 14 where assigning designators includes:
dividing the n-dimensional space into regions that are quad-tree cells (QTCs) in a quad-tree structure;
assigning a designator to each QTC using an algorithm that linearly numbers the QTCs in the divided n-dimensional space.

16. The database system of claim 15 where building a separate spatial object index record for each region which includes the location of the spatial object includes:
assigning each spatial object to one or more QTCs based on the location of the spatial object in the n-dimensional space; and
assigning a spatial object index entry for each QTC to which the spatial object was assigned, the index entry including the designator of the QTC to which the spatial object was assigned and a pointer to the spatial object.

17. The database system of claim 16 where dividing the index records substantially equally among the P partitions includes:
sorting the index entries by their QTC numbers into a list;
dividing the index entries in the list into P substantially equal parts; and
storing the index entries associated with each part in a different one of the P partitions.

18. A computer program, stored on a tangible storage medium, for use in indexing spatial objects of a partitioned parallel environment including P partitions, each partition residing on one or more parallel processing systems, each spatial object having a location in an n-dimensional space, the program including executable instructions that cause a computer to:

divide the n-dimensional space into quad-tree cells (QTCs) in a quad-tree structure, each QTC having a designator, the designators having an order;

assign each spatial object to one or more QTCs based on the location of the spatial object in the n-dimensional space;

create a spatial object index entry for each QTC to which the spatial object was assigned, the index entry including the designator of the QTC to which the spatial object was assigned and a pointer to the spatial object;

sort the index entries by their QTC numbers into QTC bins, each QTC bin corresponding to one of the QTCs, each QTC bin containing the index entries for the spatial objects that were assigned to that QTC;

working through the QTC bins in order of the QTCs' designators, divide the index entries in the QTC bins into P substantially equal parts, even when the index entries are not uniformly distributed among the QTC bins; and store the index entries associated with each part in a different one of the P partitions, at least one of the P partitions being stored on a different data storage facility than the other P-1 partitions.

\* \* \* \* \*